US012768410B2

(12) United States Patent
Kim

(10) Patent No.: US 12,768,410 B2
(45) Date of Patent: Oct. 20, 2026

(54) CALIPER BRAKE HAVING PAD SPRING

(71) Applicant: HL MANDO CORPORATION, Gyeonggi-do (KR)

(72) Inventor: Hongki Kim, Gyeonggi-do (KR)

(73) Assignee: HL MANDO CORPORATION, Gyeonggi-do (KR)

( * ) Notice: Subject to any disclaimer, the term of this patent is extended or adjusted under 35 U.S.C. 154(b) by 412 days.

(21) Appl. No.: 18/384,324

(22) Filed: Oct. 26, 2023

(65) Prior Publication Data

US 2024/0141962 A1 May 2, 2024

(30) Foreign Application Priority Data

Oct. 26, 2022 (KR) ........................ 10-2022-0139759
Feb. 22, 2023 (KR) ........................ 10-2023-0023518

(51) Int. Cl.
*F16D 65/097* (2006.01)
*F16D 55/228* (2006.01)
(Continued)

(52) U.S. Cl.
CPC ....... *F16D 65/0977* (2013.01); *F16D 55/228* (2013.01); *F16D 65/0068* (2013.01);
(Continued)

(58) Field of Classification Search
CPC ............. F16D 65/0977; F16D 65/0068; F16D 55/228; F16D 2055/0016
See application file for complete search history.

(56) References Cited

U.S. PATENT DOCUMENTS 5,687,817 A * 11/1997 Kobayashi ............ F16D 65/097 188/73.38
5,901,815 A * 5/1999 Kobayashi .......... F16D 65/0972 188/205 A (Continued)

FOREIGN PATENT DOCUMENTS

CN 107850151 3/2018
CN 219159409 6/2023

(Continued)

OTHER PUBLICATIONS

Office Action dated Jul. 30, 2024 for German Patent Application No. 10 2023 129 216.1 and its English translation provided by Applicant's foreign counsel.

(Continued)

*Primary Examiner* — Vishal R Sahni
(74) *Attorney, Agent, or Firm* — WOMBLE BOND DICKINSON (US) LLP

(57) ABSTRACT

A caliper brake includes: a housing; pistons respectively disposed on opposite sides in the housing; inner and outer pad plates at least partially disposed on the opposite sides in the housing and configured to be movable by each of the pistons; friction pads respectively disposed on the inner and outer pad plates; and a pad spring configured to guide a movement of the inner and outer pad plates in the housing, wherein each of the inner and outer pad plates includes protrusions on its opposite sides, the pad spring includes two guide supports configured to guide the movement of the inner and outer pad plates, each of the guide supports includes: a concave bent portion into which one of the protrusions of the inner and outer pad plates is inserted; and a returner configured to elastically support one of the inner and outer pad plates to return to an original position.

16 Claims, 9 Drawing Sheets

(51) Int. Cl.

| | |
|---|---|
| ***F16D 65/00*** | (2006.01) |
| *F16D 55/00* | (2006.01) |
| *F16D 121/04* | (2012.01) |
| *F16D 127/02* | (2012.01) |

(52) U.S. Cl.
CPC .. *F16D 2055/0016* (2013.01); *F16D 2121/04* (2013.01); *F16D 2127/02* (2013.01)

(56) References Cited

U.S. PATENT DOCUMENTS

| | | | | |
|---|---|---|---|---|
| 8,776,959 | B2 * | 7/2014 | Kaneko | F16D 65/0977 188/73.31 |
| 9,279,466 | B2 * | 3/2016 | Miura | F16D 65/0977 |
| 9,677,629 | B2 * | 6/2017 | Boyle | F16D 65/0978 |
| 9,945,435 | B2 * | 4/2018 | Ueda | F16D 65/0972 |
| 10,968,968 | B2 * | 4/2021 | Gerber | F16D 55/227 |
| 2004/0144602 | A1 * | 7/2004 | Ono | F16D 65/0971 188/71.7 |
| 2006/0037821 | A1 | 2/2006 | Barbosa et al. | |
| 2012/0222925 | A1 * | 9/2012 | Kaneko | F16D 65/0977 188/73.38 |
| 2013/0192938 | A1 * | 8/2013 | Miller | F16D 65/0006 188/73.31 |
| 2015/0021127 | A1 * | 1/2015 | Miura | F16D 65/0977 188/73.38 |
| 2015/0101895 | A1 | 4/2015 | Ueda et al. | |
| 2016/0076612 | A1 | 3/2016 | Merrien et al. | |
| 2020/0040953 | A1 | 2/2020 | Baek | |
| 2020/0096065 | A1 * | 3/2020 | Lim | F16D 65/0979 |
| 2021/0156438 | A1 * | 5/2021 | Toguri | F16D 65/0977 |

FOREIGN PATENT DOCUMENTS

| | | | | |
|---|---|---|---|---|
| DE | 10 2016 010 301 | | 3/2018 | |
| DE | 10 2017 001 089 | | 8/2018 | |
| EP | 2 792 899 | | 10/2014 | |
| JP | 8-226470 | | 9/1996 | |
| JP | 2010-60080 | | 3/2010 | |
| JP | 2013-96454 | | 5/2013 | |
| KR | 10-2004-0071868 | | 8/2004 | |
| KR | 10-2006-0129611 | | 12/2006 | |
| KR | 10-2013-0003932 | | 1/2013 | |
| KR | 10-2013-0095449 | | 8/2013 | |
| KR | 10-2014-0053703 | | 5/2014 | |
| KR | 20150028599 | A * | 3/2015 | F16D 65/00 |
| KR | 10-2016-0058444 | | 5/2016 | |
| KR | 10-2021-0020250 | | 2/2021 | |
| WO | 2017/114780 | | 7/2017 | |

OTHER PUBLICATIONS

Office Action dated Dec. 5, 2024 for Korean Patent Application No. 10-2023-0023518 and its English translation provided by Applicant's foreign counsel.

Office Action dated Jun. 3, 2026 for Chinese Patent Application No. 202311389794.0 and its English translation provided by Applicant's foreign counsel/Google translate.

* cited by examiner

| | | (Before deformation) | 0mm | 3mm | 6mm | 9mm |
|---|---|---|---|---|---|---|
| Case1 | Retraction Spring behavior |  |  |  |  |  |
| | [illegible] | | 2.0kgf | 3.4kgf | 3.0kgf | 3.4kgf |
| Case2 | Retraction Spring behavior |  |  |  |  |  |
| | [illegible] | | 2.3kgf | 3.3kgf | 2.8kgf | 2.9kgf |

CALIPER BRAKE HAVING PAD SPRING

CROSS-REFERENCE TO RELATED APPLICATION

This application claims priority to and the benefit of Korean Patent Application No. 10-2022-0139759, filed on Oct. 26, 2022 and 10-2023-0023518, filed on Feb. 22, 2023, in the Korean intellectual Property Office (KIPO), the disclosure of which is incorporated by reference herein in its entirety.

TECHNICAL FIELD

The present disclosure generally relates to a caliper brake having a pad spring, and more particularly, to a caliper brake having a pad spring in a brake device of a vehicle.

BACKGROUND

In general, a brake device mounted on a vehicle is a device for decelerating, stopping, or maintaining a stopped state of the vehicle. For example, the brake device provides braking force by pressing a circular plate-shaped disk rotating together with a wheel with pads from opposite sides. In the brake device, a caliper exerts a braking force by bringing a pad into close contact with the disc in the vehicle, and is also referred to as a caliper brake.

SUMMARY

Aspects of the present disclosure are directed to a caliper brake that can reduce the number of parts by eliminating pins and/or clips, shorten assembly work-hours, and be advantageous in pad behavior.

According to an embodiment of the present disclosure, a caliper brake having a pad spring includes: a housing; pistons respectively disposed on opposite sides in the housing; inner and outer pad plates disposed on the opposite sides in the housing and movable by each of the pistons; friction pads respectively disposed on the inner and outer pad plates; and a pad spring configured to guide a movement of the inner and outer pad plates in the housing, wherein each of the inner and outer pad plates includes protrusions on opposite sides, the pad spring includes two guide supports respectively guiding the movement of the inner and outer pad plates, each of the guide supports includes: a concave bent portion into which the protrusions of the inner and outer pad plates are inserted; and a returner configured to elastically support one of the inner and outer pad plates to return to an original position.

In some embodiments, the housing may include a recess into which the concave bent portion of the pad spring is inserted.

In some embodiments, the caliper brake may further include an upper connector connecting upper portions of the two guide supports.

In some embodiments, the concave bent portion may include: an upper surface; a side surface bent from the upper surface and extends downward; and a lower surface bent from the side surface toward the inner and outer pad plates.

In some embodiments, the upper surface of the concave bent portion may include an upper surface support protrusion extending upward.

In some embodiments, the returner may be disposed on the side surface of the concave bent portion.

In some embodiments, a side support protrusion bent and extending in a direction away from the inner and outer pad plates may be disposed in a lower portion of the guide support located below the concave bent portion.

In some embodiments, the housing may include a recess into which the concave bent portion of the pad spring is inserted, the side surface of the concave bent portion may include a through hole and an inner support protrusion extending from an edge of the through hole toward the recess of the housing.

In some embodiments, the recess may include a stepped portion on a bottom, and the inner support protrusion may be supported by the stepped portion.

In some embodiments, the inner support protrusion may include a bent portion supported by the stepped portion.

In some embodiments, the returner may include a bent portion bent in an inward direction of the concave bent portion at an end of the returner.

In some embodiments, the guide support may further include a lower bent support bent from a lower end of the guide support toward the inner and outer pad plates to support lower portions of the inner and outer pad plates.

In some embodiments, an up and down width of the concave bent portion may gradually increase toward an inside of the concave bent portion.

In some embodiments, the protrusion of the inner and outer pad plates may gradually increase toward the inside of the concave bent portion.

In some embodiments, the housing may include a recess into which the concave bent portion of the pad spring is inserted, and the up and down width of the recess gradually increases inwardly.

In some embodiments, the returner may include: a first protrusion bent and extending in a direction from the concave bent portion toward the inner and outer pad plates; a first bent portion bent inwardly of the concave bent portion at an end of the first protrusion; a second protrusion extending from the first bent portion in a direction away from the inner and outer pad plates; a second bent portion bent toward the inner and outer pad plates at an end of the second protrusion; and a third protrusion extending from the second bent portion toward the inner and outer pad plates.

According to another embodiment of the present disclosure, a caliper brake having a pad spring includes: a housing; pistons respectively disposed on opposite sides in the housing; inner and outer pad plates disposed on the opposite sides in the housing and movable by each of the pistons; friction pads respectively disposed on the inner and outer pad plates; and a pad spring configured to guide a movement of the inner and outer pad plates in the housing, wherein the pad spring includes two guide supports respectively guiding the movement of the inner and outer pad plates, each of the guide supports includes a returner configured to elastically support one of the inner and outer pad plates to return to an original position, and the returner includes a pair of first protrusions extending while being spaced apart from each other.

In some embodiments, the returner may further include an end connector connecting ends of the pair of first protrusions to each other.

In some embodiments, the inner and outer pad plates may include protrusions on opposite sides, and each of the guide supports may further include a concave bent portion into which the protrusions of the inner and outer pad plates are inserted.

According to one or more embodiments of the present disclosure, there is provided a caliper brake that is reduced in terms of the number of parts by eliminating pins and clips, shortens assembly work-hours, and is advantageous in pad behavior.

In addition, according to one or more embodiments of the present invention, there is provided a caliper brake capable of smoothly performing a pad return function while a pad spring stably supports a pad plate.

BRIEF DESCRIPTION OF THE DRAWINGS

The above and other aspects, features and advantages of the present disclosure will be more apparent from the following detailed description taken in conjunction with the accompanying drawings.

DETAILED DESCRIPTION

Figure 1:
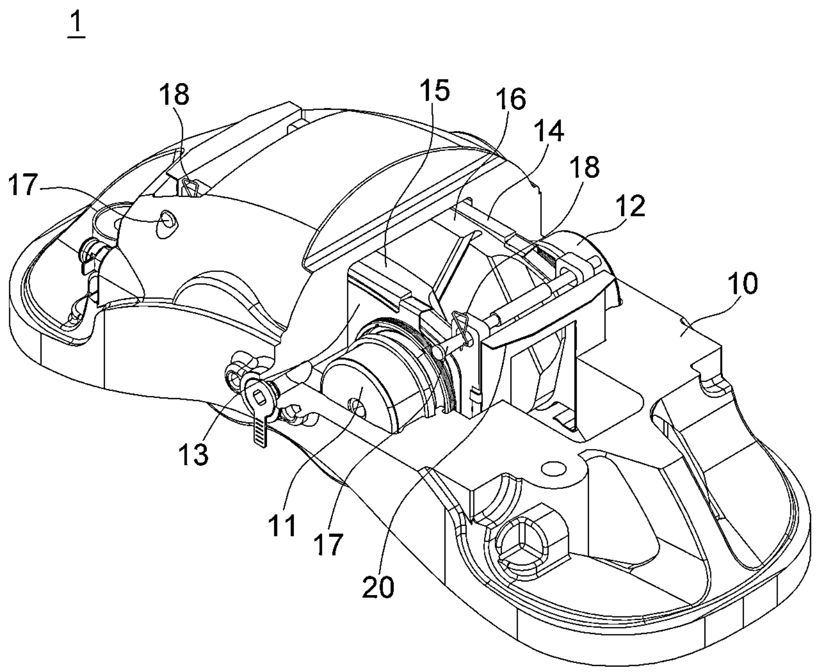
FIG. 1 is a perspective view for illustrating a fixed type caliper.

Advantages and features of the present invention, and methods of achieving them, will become clear with reference to the detailed description of the following embodiments described in conjunction with the accompanying drawings. However, the present invention is not limited to the embodiments disclosed below, but will be implemented in various different forms, these embodiments merely make the disclosure of the present invention complete, and are provided to fully inform those of ordinary skill in the art to which the present invention belongs. The present invention is only defined by the scope of the claims. Thus, in some embodiments, well-known process steps, well-known device structures, and well-known techniques have not been described in detail in order to avoid obscuring the interpretation of the present invention. Like reference numbers designate like elements throughout the specification.

In the drawings, the thickness is enlarged to clearly express the various layers and regions. Like reference numerals have been assigned to like parts throughout the specification. When a part such as a layer, film, region, plate, etc. is said to be "on" another part, this includes not only the case where it is "directly on" another part, but also the case where there is another part in between. Conversely, when a part is said to be "directly on" another part, it means that there is no other part in between. In addition, when a part such as a layer, film, region, plate, etc. is said to be "below" another part, this includes not only the case where it is "directly below" the other part, but also the case where another part is present in the middle. Conversely, when a part is said to be "directly below" another part, it means that there is no other part in between.

The spatially relative terms "below", "beneath", "lower", "above", "upper", and the like may be used to easily describe the correlation between elements or components and other elements or components. Spatially relative terms should be understood as encompassing different orientations of elements in use or operation in addition to the orientations illustrated in the drawings. For example, when flipping elements illustrated in the drawings, elements described as "below" or "beneath" other elements may be disposed "above" the other elements. Thus, the exemplary term "below" may include directions of both below and above. Elements may also be oriented in other orientations, and thus spatially relative terms may be interpreted according to orientation.

As used herein, when a part is said to be connected to another part, this includes not only the case where it is directly connected, but also the case where it is connected with another element interposed therebetween. In addition, when a part includes a certain component, it means that it may further include other components without excluding other components unless otherwise specified.

As used herein, terms such as first, second, and third may be used to describe various components, but these components are not limited by the terms. The terms are used for the purpose of distinguishing one component from other components. For example, a first component could be termed a second or third component, and the like, and similarly, a second or third component could also be termed interchangeably, without departing from the scope of the present invention.

Unless otherwise defined, all terms (including technical and scientific terms) as used herein may be used in a meaning commonly understood by those of ordinary skill in the art to which the present invention belongs. In addition, terms defined in commonly used dictionaries are not interpreted ideally or excessively unless explicitly specifically defined.

Calipers may be classified into, for example, but not limited to, a fixed type caliper in which brake pads and pistons are disposed on opposite sides of a disc with a caliper housing being fixed, so that the pads are in close contact with the disc on opposite sides of the disc to brake; and a double-acting type caliper in which a piston disposed on one side of the disc pushes a brake pad and comes into close contact with the disc, and as a reaction, the housing moves in the opposite direction such that the brake pad disposed in the housing on the opposite side of the disc moves toward the disc to brake.

Figure 2:
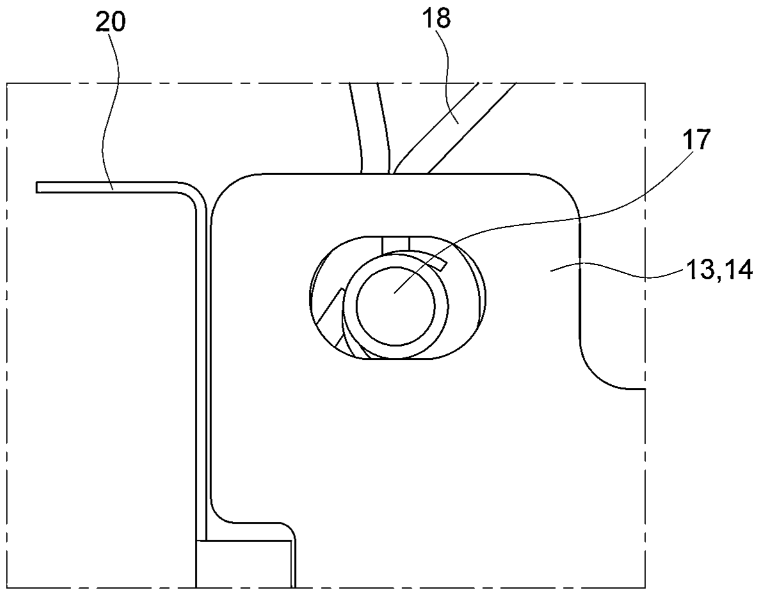
FIG. 2 is an enlarged view for illustrating a portion of the fixed type caliper where a pad plate is coupled to a pin in FIG. 1.

FIGS. 1 and 2 are views for illustrating a fixed type caliper 1. FIG. 1 is a perspective view illustrating the fixed type caliper 1, and FIG. 2 is an enlarged view for illustrating a portion where a pad plate and a pin are coupled in FIG. 1.

The fixed type caliper 1 illustrated in FIG. 1 includes a housing 10, pistons 11 and 12, pad plates 13 and 14, friction pads 15 and 16, and a pad spring 20 disposed in the housing 10.

The pistons 11 and 12 are respectively disposed on opposite sides in the housing 10 of the caliper 1, and two pistons 11 are disposed in an inner direction of the vehicle with respect to a disk while the caliper 1 is mounted on the vehicle, and two pistons 12 are disposed in an outer direction of the vehicle.

During the braking, the pistons 11 and 12 push the pad plates 13 and 14 and the friction pads 15 and 16 toward the disc.

The pad plates 13 and 14 are disposed on the piston and are respectively disposed on opposite sides in the housing 10. The pad plates 13 and 14 may move toward the disk by the pistons 11 and 12 during the braking.

The inner pad plate 13 positioned on the inner side of the disk may move by two inner pistons 11, and the outer pad plate 14 positioned on the outer side of the disk may move by two outer pistons 12.

The inner pad plate 13 and the outer pad plate 14 are coupled to one pin 17, and a clip 18 configured to prevent the pin 17 from being separated is fixed to the outside of the inner and outer pad plates 13 and 14.

The friction pads 15 and 16 are disposed on the pad plates 13 and 14 and move along with a movement of the pad plates 13 and 14 to press the disk, and the friction pads 15 and 16 are respectively disposed on the inner pad plate 13 and the outer pad plate 14.

The pad spring 20 is disposed at both ends of the inner and outer pad plates 13 and 14 to support the inner and outer pad plates 13 and 14, and is disposed between the housing 10 and both ends of the inner and outer pad plates 13 and 14.

The pad spring 20 may be fixed by a pin.

In the fixed type caliper 1, a hydraulic pressure may be provided so that the inner and outer pistons 11 and 12 move forward to push the inner and outer pad plates 13 and 14 and the friction pads 15 and 16, and thus the friction pads 15 and 16 presses the disc to generate a braking force.

In such a case, the inner and outer pad plates 13 and 14 advance in the disk direction from opposite sides of the pin 17, respectively, and are guided by the pin 17 when moving forward.

In the fixed type caliper 1, the pin 17 and the clip 18 for preventing the pin 17 from be separated may be included for guiding the pad plates 13 and 14, and a hole processing may be required to fix the pin 17 to the housing 10.

Hereinafter, a caliper brake 100 having a pad spring according to an embodiment of the present disclosure will be described in detail with reference to the drawings.

The caliper brake 100 according to an embodiment of the present embodiment will be described as an example applied to a fixed type caliper. However, the present disclosure is not limited thereto.

Figure 3:
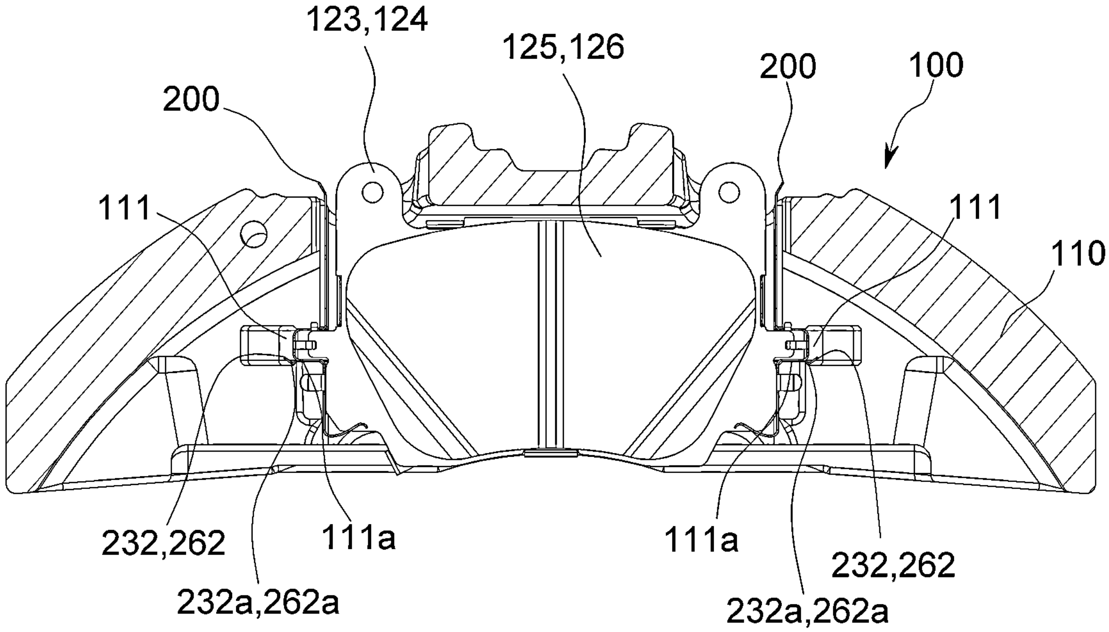
FIG. 3 is a cross-sectional view illustrating a caliper brake according to an embodiment of the present disclosure.
Figure 4:
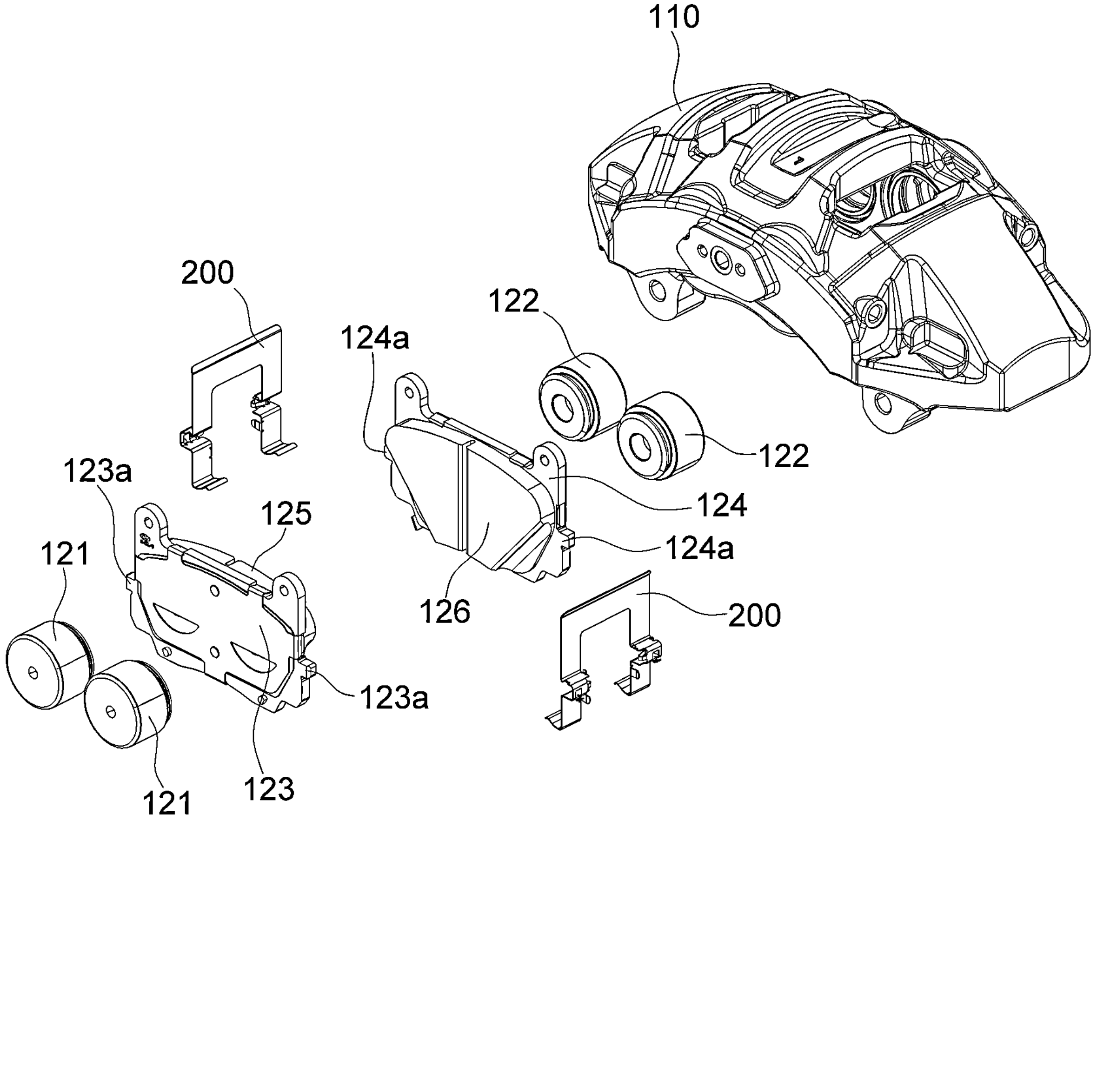
FIG. 4 is an exploded perspective view illustrating a caliper brake according to the present invention.
Figure 5:
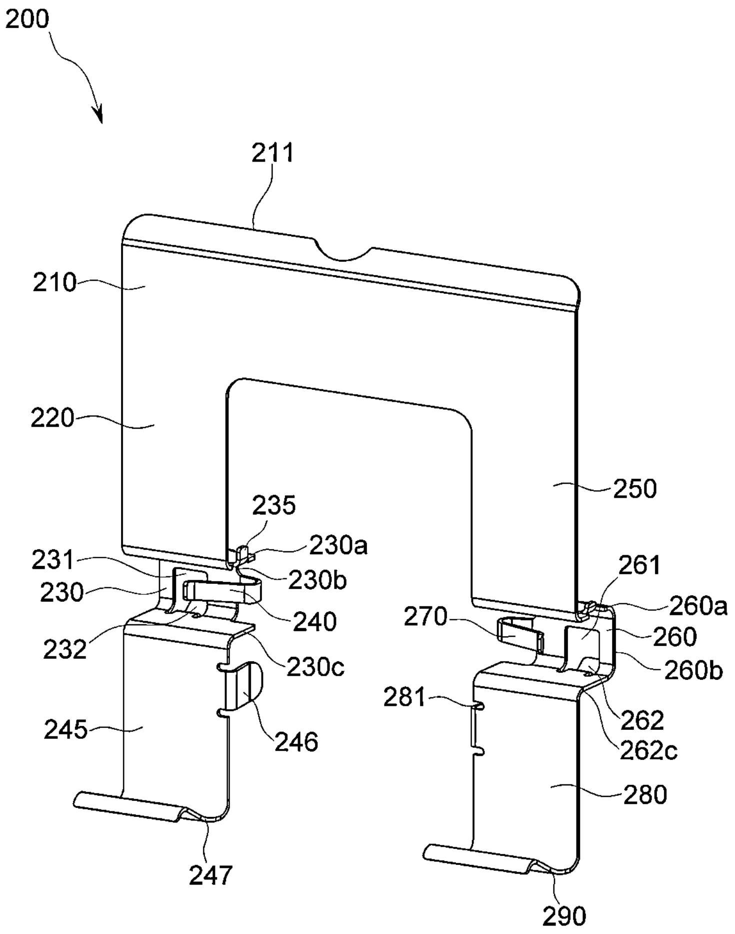
FIG. 5 is a perspective view illustrating a pad spring in the present invention.
Figure 6:
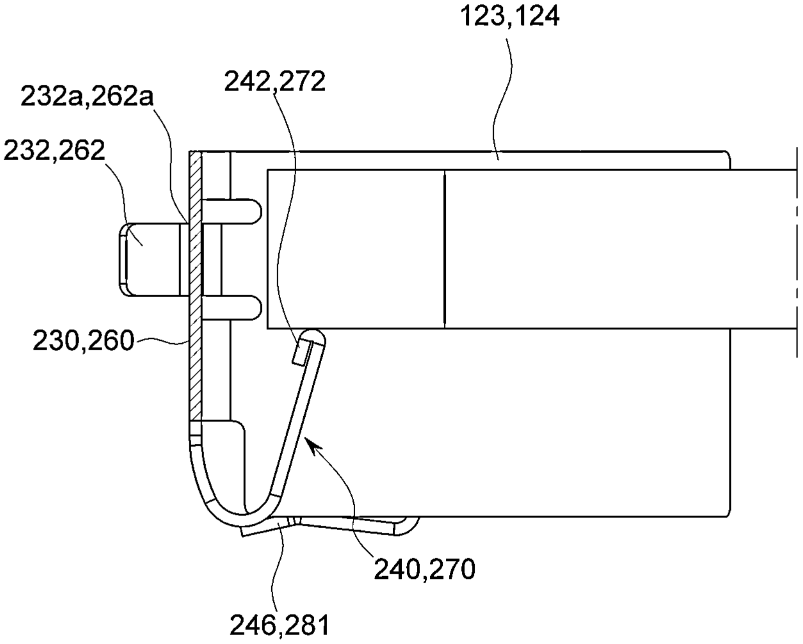
FIG. 6 is a view illustrating a coupling relationship between a pad spring and a pad plate in the present invention.
Figure 7:
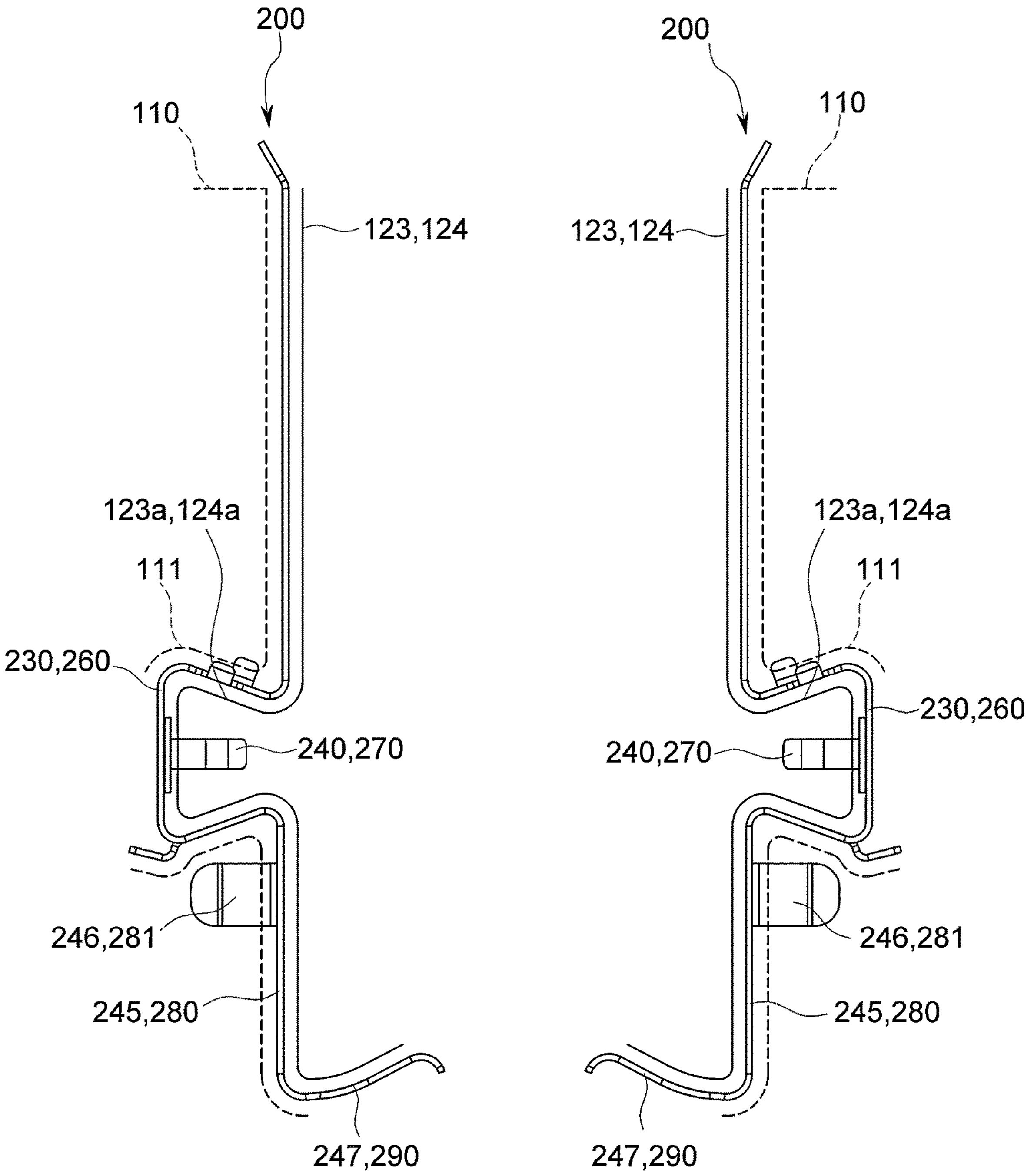
FIG. 7 is a view illustrating a pad spring according to another embodiment of the present invention.
Figure 8:
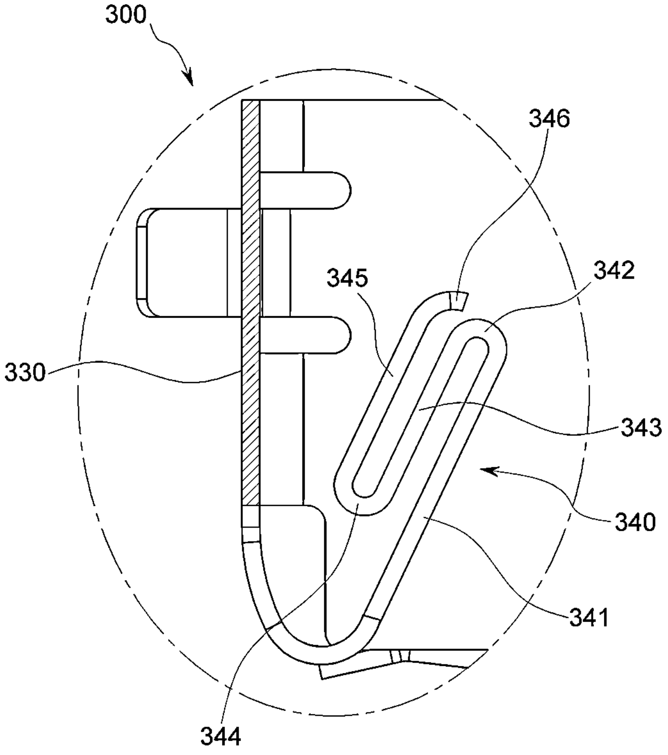
FIG. 8 is a view illustrating a pad spring according to another embodiment of the present invention.
Figure 9:
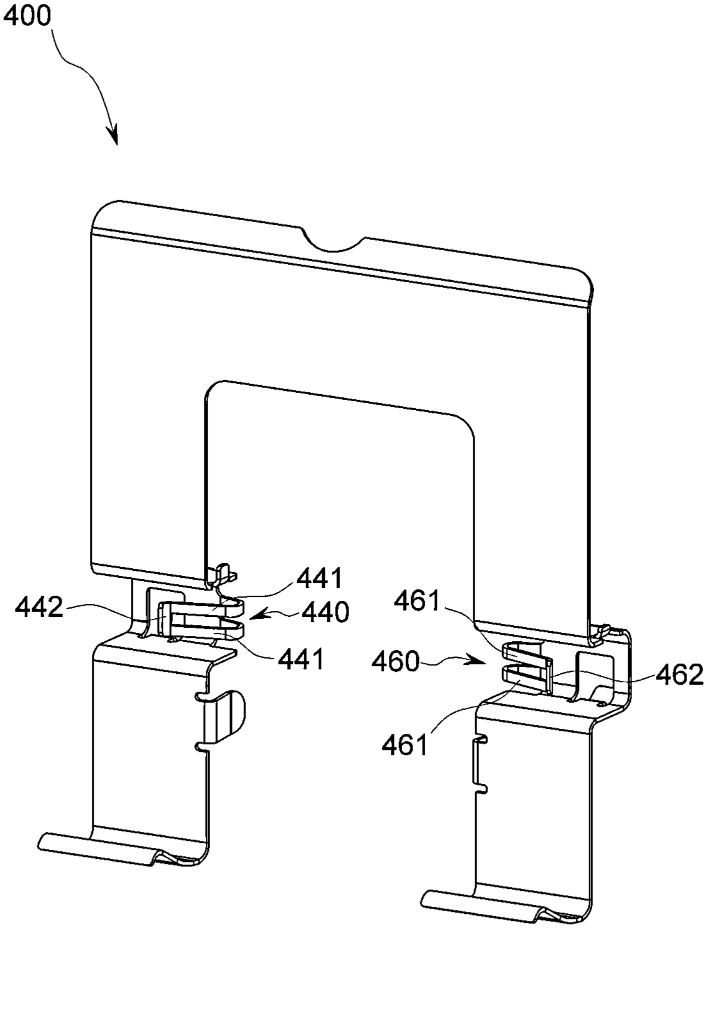
FIG. 9 is a view illustrating a pad spring according to another embodiment of the present invention.

FIG. 3 is a cross-sectional view for illustrating a caliper brake according to an embodiment of the present disclosure. FIG. 4 is an exploded perspective view for illustrating a caliper brake according to an embodiment of the present disclosure. FIG. 5 is a perspective view for illustrating a pad spring according to an embodiment of the present disclosure. FIG. 6 is a view for illustrating a coupling relationship between a pad spring and a pad plate according to an embodiment of the present disclosure. FIG. 7 is a view for illustrating a pad spring according to another embodiment of the present disclosure. FIG. 8 is a view for illustrating a pad spring according to another embodiment of the present disclosure. FIG. 9 is a perspective view for illustrating a pad spring according to another embodiment of the present disclosure.

The caliper brake 100 having a pad spring according to an embodiment of the present invention may include a housing 110, pistons 121 and 122, pad plates 123 and 124, friction pads 125 and 126, and a pad spring 200.

The housing 110 constitutes a body of the caliper brake 100, and the pistons 121 and 122, the pad plates 123 and 124, the friction pads 125 and 126, and the pad spring 200 are at least partially disposed in the housing 110.

When the caliper brake 100 is mounted to a vehicle with a lower portion of the housing 110 being opened, an upper portion of a rotor such as a disc of the brake is inserted into the housing 110 and partially disposed in the housing 110.

The pistons 121 and 122 are disposed on opposite sides of the housing 110 in the housing 110 to push the friction pads 125 and 126 toward the disc together with the pad plates 123 and 124. As illustrated in FIG. 4, two pistons are disposed on each of opposite sides of the housing 110, and in the state where the caliper brake 100 is mounted to the vehicle, two pistons 121 are located on an inner side of the disk, and two pistons 122 are located on an outer side of the disk.

Accordingly, when a hydraulic pressure is applied to a cylinder during the braking, the pistons 121 and 122 push the pad plates 123 and 124 while moving forward, and the friction pads 125 and 126 coupled to the pad plates 123 and 124 may move forward toward the disc.

The pad plates 123 and 124 are disposed on the pistons 121 and 122 and are movably disposed to move forward or backward in the housing 110. The pad plates 123 and 124 are disposed on opposite sides of the housing 110 within the housing 110, respectively. In the state where the caliper brake 100 is mounted to the vehicle, the inner pad plate 123 is located on an inner side of the disk, and the outer pad plate 124 is located on an outer side of the disk to face the inner pad plate 123.

The pad plates 123 and 124 may move toward the disk by the pistons 121 and 122 during the braking, and the inner pad plate 123 located on the inner side of the disk may move toward the disk by two inner pistons 121, and the outer pad plate 124 located on the outer side of the disk may move by two outer pistons 122.

Protrusions 123*a* and 124*a* outwardly projecting are formed on opposite side surfaces of the inner and outer pad plates 123 and 124, respectively.

Each of the protrusions 123*a* and 124*a* is inserted into concave bent portions 230 and 260 of the pad spring 200, and when the inner and outer pad plates 123 and 124 advance toward or retreat away from the disc by the pistons 121 and 122, the protrusions 123*a* and 124*a* may move in a sliding manner while being inserted into the concave bent portions 230 and 260 of the pad spring 200.

As illustrated in FIGS. 1 and 2, in the fixed type caliper 1, the inner pad plate 13 and the outer pad plate 14 are coupled to one pin 17 and guided by the pin 17 when moving forward. However, in the embodiments illustrated in FIGS. 3 to 9, the protrusions 123*a* and 124*a* on opposite sides of the pad plates 123 and 124 are slidable in a state of being inserted into the concave bent portions 230 and 260 of the pad spring 200. Accordingly, unlike an embodiment shown in FIGS. 1 and 2, the pin 17 for guiding the pad plates 13 and 14, the clip 18 for preventing the pin 17 from being separated, and the hole processing in which the pin 17 is fixed to the housing 10 are unnecessary in the other embodiment illustrated in FIGS. 3 to 9, and accordingly, the movement of the pad plates 123 and 124 may be stably guided while reducing the number of parts and reducing the number of assembly processes and work-hours (man-hours).

The friction pads 125 and 126 are for exerting braking force by pressing the disk during braking, and the friction pads 15 and 16 are disposed on the inner pad plate 13 and the outer pad plate 14, respectively, so that the pad plates 123 and 124 can move by the pistons 121 and 122 along with the movement to press the disk.

The pad spring 200 is disposed at opposite ends of the pad plates 123 and 124 to support the pad plates 123 and 124 and guide the forward and backward movement of the pad plates 123 and 124. The pad spring 200 is disposed between the housing 110 and one of opposite ends of the pad plates 123 and 124.

Each configuration of the pad spring 200 according to an embodiment the present disclosure will be described in detail with reference to FIGS. 5 and 6.

The pad spring 200 includes an upper connector 210 and two guide supports 220 and 250 spaced apart from each other.

The upper connector 210 forms an upper part of the pad spring 200 and has a substantially flat plate shape, but not limited thereto. The upper connector 210 connects the upper portions of two guide supports 220 and 250 to each other.

An upper bent portion 211 is formed at an upper end of the upper connector 210 and is bent and inclined upwardly from the upper connector 210 in a direction away from the pad plates 123 and 124.

The guide supports 220 and 250 are spaced apart from each other on opposite sides of the upper connection portion 210 and extend downward, and are coupled to the housing 110 to support the pad plates 123 and 124 and to guide forward and backward movement of the pad plates 123 and 124.

Each of the guide supports 220 and 250 is formed in a substantially flat plate shape, but not limited thereto, and the concave bent portions 230 and 260 are formed in the middle of the guide supports 220 and 250, respectively.

The concave bent portions 230 and 260 are concavely bent in a substantially 'c' or 'U' shape in a direction away from the pad plates 123 and 124 and inserted into a recess 111 of the housing 110. Accordingly, the recess 111 of the housing 110 into which the concave bent portions 230 and 260 are inserted is also formed concave in a substantially 'c' shape in cross-section to correspond to the shape of the concave bent portion 230 and 260 of the pad spring 200.

The concave bent portions 230 and 260 include upper surfaces or parts **230*a* and 260*a* bent in a direction toward the groove 111 of the housing 110 from the upper portion of the guide supports 220 and 250, side surfaces or parts 230*b* and 260*b* bent from the upper surfaces 230*a* and 260*a* and extending downward, and lower surfaces or parts 230*c* and 260*c* bent from the side surfaces 230*b* and 260*b* toward the pad plates 123 and 124**, respectively.

The upper surfaces or parts **230*a* and 260*a* of the concave bent portions 230 and 260 are bent at a substantially right angle from the upper portions of the guide supports 220 and 250 (e.g. a direction perpendicular to the guide supports 220) and extend in the direction toward the recess 111 of the housing 110, and an upper surface support protrusion or tab 235 extending upward is formed at an inner edge of each of the upper surfaces or parts 230*a* and 260*a* adjacent to two guide support portions 220 and 250. The upper surface support protrusion or tab 235 is supported on an upper edge of the recess 111 in the housing 110 into which the concave bent portions 230 and 260** are fitted.

The side surfaces or parts **230*b* and 260*b* of the concave bent portions 230 and 260 are bent at a substantially right angle from the upper surfaces or parts 230*a* and 260*a* (e.g. a direction perpendicular to the upper surfaces or parts 230*a* and 260*a*) and extend downward. Throughholes 231 and 261 are formed in the side surfaces or parts 230*b* and 260*b*, and inner support protrusions or tabs 232 and 262 extending in the direction toward the recess 111 of the housing 110 are formed at, or extends from, a lower edge of the throughholes 231 and 261. The inner support protrusions or tabs 232 and 262 are supported on a bottom of the recess 111 of the housing 110. To this end, the recess 111 of the housing 110 may be formed deeper (in a direction away from the pad plates 123 and 124) than the concave bent portions 230 and 260, and a stepped portion 111*a* may be formed in the recess 111 such that the inner support protrusions 232 and 262 are supported. As illustrated in FIG. 3, the stepped portion 111*a* of the recess 111 including a step which is more concave than the bottom of the recess 111 on which the lower surfaces 230*c* and 260*c* of the concave bent portions 230 and 260 are supported may be formed, and the inner support protrusions 232 and 262 of the pad spring 200 are supported on the stepped portion 111*a* of the housing 110**.

The inner support protrusions or tabs 232 and 262 may have bent portions **232*a* and 262*a* bent in a V shape, and the bent portions 232*a* and 262*a* of the pad spring 200 may be supported by the stepped portion 111*a* of the recess 111 to prevent separation from the recess 111 of the housing 110** and be supported more firmly.

In addition, returners 240 and 270 (e.g. returning tabs) are formed at inner edges adjacent to the two guide supports 220 and 250 on each of the side surfaces or parts **230*b* and 260*b***.

The returners 240 and 270 elastically support the pad plates 123 and 124 to return the pad plates 123 and 124 and the friction pads 125 and 126 to their original positions when the braking is released. The returners 240 and 270 have shapes bent and extending outwardly from an inner edge (e.g. to direction toward the pad plates 123 and 124) of each of the side surfaces or parts **230*b* and 260*b*). Ends of the returners 240 and 270 may be bent toward the pad plates 123 and 124. In addition, as illustrated in FIG. 6, ends of the returners 240 and 270 may include bent portions 242 and 272 which are bent in an inward direction of the concave bent portions 230 and 260 (e.g. in a direction away from the pad plates 123 and 124**).

As described above, the pad spring 200 according to an embodiment of the present disclosure includes the returners 240 and 270 on the side surfaces of parts **230*b* and 260*b* of the concave bent portions 230 and 260, so that the returners 240 and 270 may elastically support the pad plates 123 and 124 and allow the pad plates 123 and 124** to be quickly returned to their original positions when the brakes are released. Accordingly, residual drag may be reduced or improved when the brake hydraulic pressure is released due to the release of the brakes, thereby reducing noise and improving vehicle fuel efficiency.

The lower surfaces or parts **230*c* and 260*c* of the concave bent portions 230 and 260 are bent toward the pad plates 123 and 124 from the side surfaces or parts 230*b* and 260*b* and are supported on the bottom of the recess 111 of the housing 110**.

Lower portions 245 and 280 of the guide supports 220 and 250 are bent and extend downward from the lower surfaces or parts **230*c* and 260*c* of the concave bent portions 230 and 260, and side support protrusions or tabs 246 and 281 are formed at, project from, inner edges adjacent to two guide supports 220 and 250. The side support protrusions 246 and 281 are bent and extend rearward from the inner edges adjacent to two guide supports 220 and 250 at the lower portions 245 and 280 of the guide supports 220 and 250 (e.g. in a direction away from the pad plates 123 and 124), and are supported by the housing 110. In such a way, the side support protrusions or tabs 246 and 281 are formed on or at the lower portions 245 and 280 of each of the guide supports 220 and 250, such that the fixation of the guide supports 220** and 250 for the pad plates 123 and 124 may be stably secured when the pad plates 123 and 124 move forward (e.g. move toward the disc).

The pad spring 200 includes lower bent portions 247 and 290 at lower ends of the lower portions 245 and 280 of the guide supports 220 and 250.

The lower bent portions 247 and 290 are bent at the lower portions 245 and 280 of the guide supports 220 and 250 to support the lower portions of the pad plates 123 and 124, and the lower portions 245 and 280 of the guide supports 220 and 250 are bent and extend from lower ends of the lower portions 245 and 280 forward (e.g. in a direction toward the pad plates 123 and 124) to support the lower portions of the pad plates 123 and 124.

Next, an operation of the caliper brake 100 provided with the pad spring 200 according to an embodiment of the present disclosure will be described.

When a hydraulic pressure is applied during the braking in a state where the protrusions 123*a* and 124*a* formed on opposite sides of the pad plates 123 and 124 are inserted into the concave bent portions 230 and 260 of the pad spring 200, the pistons 121 and 122 push the pad plates 123 and 124 while moving forward (e.g. moving toward the disc).

Then, the pad plates 123 and 124 are sidably supported or guided by the pad spring 200 and is configured to be slidable.

Then, while the pad plates 123 and 124 move forward (e.g. move toward the disc), as illustrated in FIG. 6, the pad plates 123 and 124 move forward (e.g. a downward direction in FIG. 6) while contacting ends of the returners or returning tabs 240 and 270 of the pad spring 200, and the returners 240 and 270 are deformed along with the advancement of the pad plates 123 and 124.

At the same time, as the pad plates 123 and 124 move forward (e.g. move toward the disc), the friction pads 125 and 126 coupled to the pad plates 123 and 124 press the disc to exert a braking force.

Then, when the brake is released, the returners 240 and 270 are returned to their original state as illustrated in FIG. 6 by the restoring force of the returners 240 and 270 of the pad spring 200, and the pad plates 123 and 124 released from the brake hydraulic pressure can return to their original positions by the returners 240 and 270.

When the brake is released, if the pad plate 123, 124 does not quickly return to its original position, noise may be generated due to residual drag, which adversely affects the fuel efficiency of the vehicle. According to an embodiment of the present disclosure, the pad plate 123 and 124 may quickly return to their original position by the returners or returning tab 240 and 270 to improve residual drag, thereby improving vehicle fuel efficiency along with noise reduction.

Figure 10:
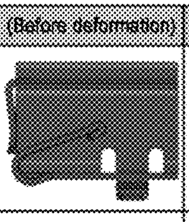
FIG. 10 is a table showing an experimental of a return reaction force of a pad spring in the present invention.
Figure 10:
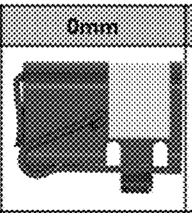
Figure 10:
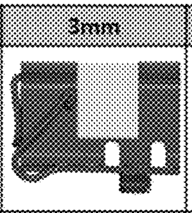
Figure 10:
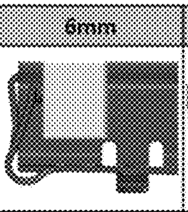
Figure 10:
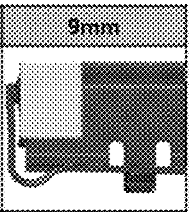
Figure 10:
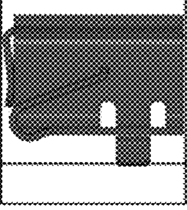
Figure 10:
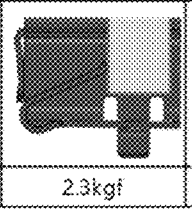
Figure 10:
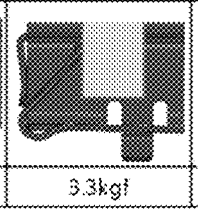
Figure 10:
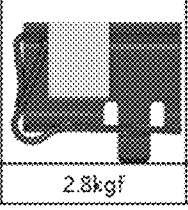
Figure 10:
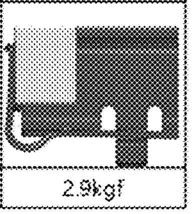

FIG. 10 is a table showing an experimental of a return reaction force of the pad spring 200 according to an embodiment of the present disclosure, and shows a return reaction force according to the deformation of the returners 240 and 270 as the pad plates 123 and 124 move forward (e.g. move toward the disc). In FIG. 10, Case 1 is an example in which the bent portions 242 and 272 of the ends of the returners 240 and 270 of the pad spring 200 are bent in a direction away from the pad plates 123 and 124, and Case 2 is an example in which the bent portions 242 and 272 of the ends of the returners 240 and 270 of the pad spring 200 are bent in a direction toward the pad plates 123 and 124.

As illustrated in FIG. 10, in Case 1, the return reaction force was larger according to the deformation of the returners 240 and 270.

Table 1 below is a table showing drag values according to a brake pressure (all units of result values: kgf. cm, CL indicates reliability).

In Table 1, when the brake pressure is 15 bar, the average drag value is 0.6 when the returner 240, 270 is applied to a pad spring, but it is 22 when the returner 240, 270 is not applied to a pad spring. Accordingly, Table 1 shows that the drag value is significantly reduced when the returner 240, 270 according to an embodiment of the present disclosure is applied to the pad spring.

TABLE 1

| | Baseline | | 15 bar | | 30 bar | | |
|---|---|---|---|---|---|---|---|
| Category | Average | Standard deviation | Average | Standard deviation | Average | Standard deviation | Remarks |
| Result | 0.5 | 0.4 | 0.6 | 0.4 | 1.0 | 0.8 | Returner |
| CL 95% | 1.1 | | 1.3 | | 2.4 | | applied |
| Result | 18.1 | 5.2 | 22.0 | 4.0 | 30.9 | 4.2 | Returner |
| CL 95% | 26.7 | | 28.6 | | 37.9 | | not applied |

Next, a pad spring 200 according to a second embodiment of the present invention will be described with reference to FIGS. 7 to 9. FIG. 7 is a side view for illustrating a pad spring 200 according to a second embodiment of the present disclosure.

The pad spring 200 according to a second embodiment of the present disclosure is different from the first embodiment in that an up and down width of the concave bent portions 230 and 260 (e.g. a distance between the lower surface or part 230*c*, 260*c* and the upper surface or part 230*a*, 260*a*) in the pad spring 200 gradually increases toward an inner side of the recess 111 of the housing 110. In addition, an up and down width of the recess 111 of the housing 110 (e.g. a distance between an upper inner surface and a lower inner surface of the recess 111) also gradually increases, and the left and right protrusions 123*a* and 124*a* of the pad plates 123 and 124 inserted into the concave bend portions 230 and 260 are also formed to have an up and down width (e.g. a thickness or a distance between an upper surface and a lower surface of the left and right protrusions 123*a* and 124*a*) gradually increasing toward the inner side of the concave bent portions 230 and 260.

In the second embodiment, the up and down width of the concave bent portions 230 and 260 of the pad spring 200, the recess 111 of the housing 110, and the left and right protrusions 123*a* and 124*a* of the pad plates 123 and 124 gradually increases toward the inner side of the concave bent portions 230 and 260, when the pad plates 123 and 124 are guided by the pad spring 200 to move in a sliding manner, left and right movements may be suppressed, so that the straightness of the pad plates 123 and 124 may be improved and the pad plates 123 and 124 may move and be supported more stably.

Other configurations and effects of the second embodiment are the same as or similar to those of the first embodiment of the present disclosure described above, so detailed descriptions thereof are omitted here.

Next, a pad spring 300 according to a third embodiment of the present disclosure will be described. FIG. 8 is a side view for illustrating a portion of a pad spring 300 according to a third embodiment of the present disclosure.

The pad spring 300 according to a third embodiment of the present disclosure is different from the first and second embodiments in that a returner 340 of a concave bent portion in a pad spring includes a first protrusion 341 bent and extending from an inner edge of side portions or parts 230*b* and 260*b* outwardly (e.g. in a direction toward the pad plates 123 and 124); a first bent portion 342 bent toward an inner side of a concave bent portion 330 from an end of the first protrusion 341; a second protrusion 343 extending from the first bent portion 342 toward an inner edge of the concave bent portion 330 (e.g. a direction away from the pad plates 123 and 124); a second bent portion 344 bent in a direction toward the pad plates 123 and 124 from an end of the second protrusion 343; a third protrusion 345 extending from the second bent portion 344 toward the pad plates 123 and 124; and a third bent portion 346 bent in a direction toward the first bent portion 342 from an end of the third protrusion 345.

Since the pad spring 300 according to the third embodiment of the present disclosure is configured as described above, during the braking, the pad plates 123 and 124 may move forward (e.g. toward the disc), and the third bent portion 346 may contact the first bent portion 342 by the pad plates 123 and 124 to deform the returner 340, and when the brake is released, the pad plates 123 and 124 may return more quickly and stably by an additional restoring force provided by the third bent portion 346 being separated from the first bent portion 342 along with the restoring force of the first protrusion 341 in addition to the restoring force of the second protrusion 343 and the third protrusion 345.

Other configurations and effects of the third embodiment are the same as or similar to those of the first and second embodiments, so a detailed description thereof will be omitted herein, and the configuration of the pad spring 200 of the second embodiment may also be applied to the third embodiment.

Next, a pad spring 400 according to a fourth embodiment of the present disclosure will be described. FIG. 9 is a perspective view for illustrating a pad spring 400 according to a fourth embodiment of the present disclosure.

The pad spring 400 according to a fourth embodiment of the present disclosure is different from the first to third embodiments in that in the pad spring 400, returners 440 and 460 of concave bent portions 430 and 460 include a pair of first protrusions 441 formed by being bent from an inner edges of the side surfaces or parts 230*b* and 260*b* outwardly (e.g. in a direction toward the pad plates 123 and 124) and extending while being spaced apart from each other; and an end connector 442 connecting ends of the pair of first protrusions 441. The end connector 442 may be bent outwardly of the concave bent portions 430 and 460 or may be bent inwardly toward the concave bent portions 430 and 460.

In the fourth embodiment, as the pad plates 123 and 124 move forward (e.g. toward the disc) during the braking, the pad plates 123 and 124 come into contact with the end connector 442 so that the pair of first protrusions 441 are deformed and when the brake is released, the pad plates 123 and 124 may return to their original position by the restoring force of the pair of first protrusions 441. In the fourth embodiment, the two first protrusions 441 are paired to form the returners 440 and 460, so that the restoring force is doubled so that the pad plates 123 and 124 may quickly return to their original positions.

Hereinabove, the present invention has been described with reference to embodiments, but the present invention is not limited thereto, and various modifications may be made by those of ordinary skill in the art within the scope without departing from the gist of the present invention described in the claims below

What is claimed is:

1. A caliper brake comprising:
- a housing;
- pistons disposed on opposite sides in the housing;
- inner and outer pad plates at least partially disposed in the housing and configured to be movable by the pistons, each of the inner and outer pad plates having protrusions on opposite sides of each of the inner and outer pad plates;
- inner and outer friction pads coupled to the inner and outer pad plates, respectively; and
- a pad spring comprising a plurality of guide supports configured to guide movement of the inner and outer pad plates, each of the guide supports comprising:
  - a concave bent portion in which one of the protrusions of the inner and outer pad plates is disposed; and
  - a returning tab configured to elastically support one of the inner and outer pad plates so that the one of the inner and outer pad plates returns to an original position by the returning tab in response to the movement of the one of the inner and outer pad plates,
- wherein the returning tab comprises:
- a first protrusion bent and protruding from the concave bent portion of the pad spring toward the one of the inner and outer pad plates;
- a first bent portion bent from the first protrusion toward an inside of the concave bent portion of the pad spring;
- a second protrusion extending from the first bent portion in a direction away from the one of the inner and outer pad plates;
- a second bent portion bent from the second protrusion toward the one of the inner and outer pad plates; and
- a third protrusion extending from the second bent portion toward the one of the inner and outer pad plates.

2. The caliper brake of claim 1, wherein the housing includes a recess in which the concave bent portion of the pad spring is disposed.

3. The caliper brake of claim 1, further comprising an upper connector connecting upper portion of the guide supports of the pad spring.

4. The caliper brake of claim 1, wherein the concave bent portion of the pad spring comprises:
- an upper part;
- a side part bent downwardly from the upper part of the concave bent portion of the pad spring; and
- a lower part bent from the side part of the concave bent portion of the pad spring toward the one of the inner and outer pad plates.

5. The caliper brake of claim 4, further comprising an upper part support protrusion protruding upwardly from the upper part of the concave bent portion of the pad spring.

6. The caliper brake of claim 4, wherein the returning tab is extended from the side part of the concave bent portion bent downwardly from the upper part of the concave bent portion of the pad spring.

7. The caliper brake of claim 4, further comprising a side support protrusion bent and protruding from a lower portion of one of the guide supports, located below the concave bent portion, in a direction away from the one of the inner and outer pad plates.

8. The caliper brake of claim 4, wherein:

the housing includes a recess in which the concave bent portion of the pad spring is disposed, and the side part of the concave bent portion bent downwardly from the upper part of the concave bent portion of the pad spring has a through hole and an inner support protrusion protruding from an edge of the through hole toward the recess of the housing.

9. The caliper brake of claim 8, wherein:

a stepped portion is formed on a bottom of the recess of the housing, and the inner support protrusion protruding from the edge of the through hole of the side part of the concave bent portion toward the recess of the housing is supported by the stepped portion formed on the bottom of the recess of the housing.

10. The caliper brake of claim 9, wherein the inner support protrusion protruding from the edge of the through hole of the side part of the concave bent portion toward the recess of the housing has a bent portion supported by the stepped portion formed on the bottom of the recess of the housing.

11. The caliper brake of claim 1, wherein the returning tab includes a bent portion bent at an end of the returning tab in a direction away from the one of the inner and outer pad plates.

12. The caliper brake of claim 1, wherein at least one of the guide supports further includes a lower bent portion bent from a lower end of the at least one of the guide supports toward the one of the inner and outer pad plates to support a lower portion of the one of the inner and outer pad plates.

13. The caliper brake of claim 1, wherein a distance between an upper part and a lower part of the concave bent portion gradually increases in a direction away from the one of the inner and outer pad plates.

14. The caliper brake of claim 13, wherein a thickness of the one of the protrusions of the inner and outer pad plates gradually increases toward a distal end of the one of the protrusions of the inner and outer pad plates.

15. The caliper brake of claim 14, wherein the housing includes a recess in which the concave bent portion of the pad spring is disposed, and a distance between an upper surface and a lower surface of the recess of the housing gradually increases inwardly.

16. The caliper brake of claim 1, wherein the returning tab further comprises a third bent portion bent from an end of the third protrusion of the returning retainer toward the first bent portion bent from the first protrusion toward the inside of the concave bent portion of the pad spring.

* * * * *